US009988759B2

(12) United States Patent
Minami et al.

(10) Patent No.: US 9,988,759 B2
(45) Date of Patent: Jun. 5, 2018

(54) FLUOROSILICONE POLYMERS AND SURFACE TREATMENT AGENT

(75) Inventors: Shinichi Minami, Settsu (JP); Takashi Enomoto, Settsu (JP); Tetsuya Masutani, Settsu (JP); Masahiro Miyahara, Settsu (JP); Mitsuhiro Usugaya, Osaka (JP); Rumi Takeuchi, Settsu (JP); Ikuo Yamamoto, Settsu (JP); Peter Cheshire Hupfield, Dyfed (GB)

(73) Assignees: Dow Silicones Corporation, Midland, MI (US); Daikin Industries, Ltd., Osaka (JP)

( * ) Notice: Subject to any disclaimer, the term of this patent is extended or adjusted under 35 U.S.C. 154(b) by 1033 days.

(21) Appl. No.: 13/063,809

(22) PCT Filed: Sep. 11, 2009

(86) PCT No.: PCT/JP2009/066317
§ 371 (c)(1),
(2), (4) Date: Jun. 6, 2011

(87) PCT Pub. No.: WO2010/030042
PCT Pub. Date: Mar. 18, 2010

(65) Prior Publication Data
US 2011/0287678 A1    Nov. 24, 2011

Related U.S. Application Data

(60) Provisional application No. 61/096,919, filed on Sep. 15, 2008.

(51) Int. Cl.
| *B32B 27/04* | (2006.01) |
| *D06M 15/643* | (2006.01) |
| *C08F 283/12* | (2006.01) |
| *C08F 290/06* | (2006.01) |
| *D06M 15/277* | (2006.01) |
| *D06M 15/356* | (2006.01) |

(52) U.S. Cl.
CPC ..... *D06M 15/6436* (2013.01); *C08F 283/122* (2013.01); *C08F 290/068* (2013.01); *D06M 15/277* (2013.01); *D06M 15/3568* (2013.01); *Y10T 442/2172* (2015.04)

(58) Field of Classification Search
CPC . C08F 283/122; C08F 290/068; D06N 3/047; D06M 15/277; D06M 15/3568; D06M 15/6436
USPC .................................. 442/87, 88, 94, 98, 99
See application file for complete search history.

(56) References Cited

U.S. PATENT DOCUMENTS 4,070,152 A    1/1978  Pentz
4,997,893 A *  3/1991  Suling et al. .............. 525/517.5
5,068,295 A   11/1991  Misaizu et al.
5,247,008 A    9/1993  Michels et al.
5,258,458 A   11/1993  Allewaert et al.
5,536,304 A    7/1996  Coppens et al.
5,599,883 A    2/1997  Ohsugi et al.
5,883,185 A    3/1999  Matsumura et al.
6,309,752 B1 * 10/2001  Dams ................... D06M 15/263
                                                        428/392
6,472,019 B1  10/2002  Yamaguchi et al.
6,582,620 B2   6/2003  Miyadai et al.
2004/0077237 A1*  4/2004  Audenaert ........... C08G 18/025
                                                        442/82
2006/0188711 A1*  8/2006  Kishioka ................ C09J 7/0217
                                                        428/343
2007/0100064 A1*  5/2007  Fukumori ........... C08F 214/182
                                                        524/556
2007/0190874 A1*  8/2007  Vazquez ........................ 442/81
2007/0287954 A1* 12/2007  Zhao .......................... 604/93.01
2008/0127429 A1*  6/2008  Brun et al. ....................... 8/435
2009/0035508 A1*  2/2009  Parker ................... C08F 251/00
                                                        428/96
2009/0302262 A1* 12/2009  Gotz ........................ C07C 31/38
                                                        252/8.62

FOREIGN PATENT DOCUMENTS

| EP | 0383310 A2 | 2/1990 |
| EP | 0777009 A2 | 11/1996 |
| JP | 58-042682  | 3/1983 |

(Continued)

OTHER PUBLICATIONS

Japanese Office Action dated Aug. 13, 2013 pertaining to Japanese Application No. 2011-511928.
International Search Report and Written Opinion dated Dec. 11, 2009 pertaining to International application No. PCT/JP2009/066317.

*Primary Examiner* — Peter Y Choi
*Assistant Examiner* — Jennifer A Gillett
(74) *Attorney, Agent, or Firm* — Dinsmore & Shohl LLP

(57) ABSTRACT

A surface treatment agent, which can impart the excellent water- and oil-repellency, soil resistance and feeling to the substrate, is obtained from a fluorine-containing polymer which contains: (A) a monomer which comprises; (A1) a fluorine-containing monomer of the formula: $CH_2=C(-X)-C(=O)-Y-Z-Rf$ wherein X is a hydrogen atom, a monovalent organic group, or a halogen atom, Y is —O— or —NH—, Z is a direct bond or a divalent organic group, and Rf is a fluoroalkyl group having 1 to 20 carbon atoms, and (A2) a (meth)acrylate monomer having a cyclic hydrocarbon group, and (B) at least one functional organopolysiloxane selected from the group consisting of a mercapto-functional organopolysiloxane, a vinyl-functional organopolysiloxane, a (meth)acrylamide-functional organopolysiloxane and a (meth)acrylate-functional group.

18 Claims, No Drawings

(56) References Cited

FOREIGN PATENT DOCUMENTS

| | | |
|---|---|---|
| JP | 60-190408 | 9/1985 |
| JP | 63-075082 | 4/1988 |
| JP | 2214791 A | 8/1990 |
| JP | 03-231986 | 10/1991 |
| JP | 5-263037 A | 10/1993 |
| JP | 7-157522 A | 6/1995 |
| JP | 9143877 A | 6/1997 |
| JP | 2005-082719 A | 3/2005 |
| WO | 2004/069935 A1 | 8/2004 |
| WO | 2004/069955 A1 | 8/2004 |
| WO | 2006/121171 A1 | 11/2006 |
| WO | WO 2006121171 A1 * | 11/2006 .......... C08F 283/122 |
| WO | WO 2006127882 A2 * | 11/2006 ............. C11D 1/008 |

* cited by examiner

FLUOROSILICONE POLYMERS AND SURFACE TREATMENT AGENT

CROSS REFERENCE TO RELATED APPLICATIONS

This application has priority from U.S. Application No. 61/096,919 filed Sep. 15, 2008, disclosures of which are incorporated herein by reference.

TECHNICAL FIELD

This invention relates to a fluorosilicone reaction product of a functional organopolysiloxane and a fluorine-containing monomer, and methods of preparing the fluorosilicone.

The fluorosilicone reaction product (that is, a fluorine- and silicon-containing polymer) is useful for a surface treatment agent (that is, a fluorine- and silicon-containing surface treatment agent) imparting excellent water repellency, oil repellency, soil resistance, and feeling to a substrate such as a textile.

BACKGROUND ARTS

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. Nos. 6,582,620 and 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat. No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulphated fatty acid compound and WO 2004/069935 and WO 2004/069955 describe a fluorine containing polymer delivered as an aqueous dispersion for textile treatment.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric.

Hitherto, in order to give both water- and oil-repellency and softness to a substrate such as a textile, a water- and oil-repellent composition comprising a perfluoroalkyl group giving water- and oil-repellency and a silicone compound giving softness has been widely used. Please see, for example, JP-A-58-42682, JP-A-60-190408, JP-A-63-075082, JP-A-09-143877, and U.S. Pat. No. 4,070,152.

There is, for example, a method of using a copolymer of a fluorine-containing acrylate monomer and a silicone acrylate monomer for the same purpose (for example, JP-A-02-214791 and JP-A-03-231986). This method, however, has the problem that the water- and oil-repellency is decreased.

PROBLEMS TO BE SOLVED BY THE INVENTION

An object of the present invention is to provide a water- and oil-repellent agent comprising a fluorine-containing acrylate polymer which imparts excellent and durable water- and oil-repellency and soil resistance, and good feeling to a substrate, when the substrate is treated with the water- and oil-repellent agent.

SUMMARY OF THE INVENTION

The present inventors discovered that the above-mentioned object can be achieved by a polymer which is formed from a monomer comprising a fluorine-containing monomer and which is polymerized in the presence of a functional organopolysiloxane.

The present invention provides a fluorine-containing polymer comprising repeating units derived from a monomer comprising a fluorine-containing monomer, wherein the fluorine-containing polymer has a silicone moiety possessed by (or derived from) a functional organopolysiloxane.

The present invention also provides a method of producing a fluorine-containing polymer comprising repeating units derived from a monomer comprising a fluorine-containing monomer, wherein the method comprises polymerizing the monomer in the presence of a functional organopolysiloxane to give the fluorine-containing polymer.

This invention provides a fluorine-containing polymer comprising:
(A) a monomer which comprises;
  (A1) a fluorine-containing monomer of the formula:

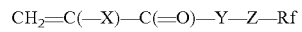

wherein X is a hydrogen atom, a monovalent organic group, or a halogen atom,
  Y is —O— or —NH—,
  Z is a direct bond or a divalent organic group, and
  Rf is a fluoroalkyl group having 1 to 20 carbon atoms, and
  (A2) a (meth)acrylate monomer having a cyclic hydrocarbon group, and
(B) at least one functional organopolysiloxane selected from the group consisting of a mercapto-functional organopolysiloxane, a vinyl-functional organopolysiloxane, a (meth)acrylamide-functional organopolysiloxane and a (meth)acrylate-functional group.

The present invention also provides a method of producing a fluorine-containing polymer comprising polymerizing:
(A) a monomer which comprises;
  (A1) a fluorine-containing monomer of the formula:

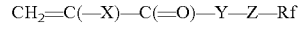

wherein X is a hydrogen atom, a monovalent organic group, or a halogen atom,
  Y is —O— or —NH—,
  Z is a direct bond or a divalent organic group, and
  Rf is a fluoroalkyl group having 1 to 20 carbon atoms, and
  (A2) a (meth)acrylate monomer having a cyclic hydrocarbon group, in the presence of;
(B) at least one functional organopolysiloxane selected from the group consisting of a mercapto-functional organopolysiloxane, a vinyl-functional organopolysiloxane, a (meth)acrylamide-functional organopolysiloxane and a (meth)acrylate-functional group.

The fluorine-containing polymer (that is, a fluorosilicone product) of the present invention is useful to provide oil repellent properties to a variety of surfaces. When treating textiles, the fluorosilicone of the present invention may also provide a softer hand or feel than conventional fluorocarbon based oil repellent treatments.

EFFECTS OF THE INVENTION

According to the present invention, when a substrate is treated, the water- and oil-repellent agent comprising the fluorine-containing acrylate polymer can impart the excellent and durable water- and oil-repellency and soil resistance to the substrate. When the substrate is a textile, the treated textile has good feeling.

MODE FOR CARRYING OUT THE INVENTION

In the present invention, the monomer (A) forming the fluorine-containing polymer comprises:
(A1) a fluorine-containing monomer,
(A2) a (meth)acrylate monomer having a cyclic hydrocarbon group, and
(A3) optionally present, a monomer other than the monomers (A1) and (A2).

The fluorine-containing polymer can be prepared by polymerizing the monomers (A1) and (A2) and optionally (A3) in the presence of the functional organopolysiloxane (B).
(A) Monomer
(A1) Fluorine-containing Monomer Component (A1) of the present invention is a fluorine-containing monomer of the formula:

$$CH_2=C(-X)-C(=O)-Y-Z-Rf$$

wherein X is a hydrogen atom, a monovalent organic group, or a halogen atom,
Y is —O— or —NH—,
Z is a direct bond or a divalent organic group, and
Rf is a fluoroalkyl group having 1 to 20 carbon atoms. Z may be for example a linear or branched alkylene group having 1 to 20 carbon atoms, for example a group of the formula 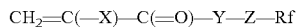 where x is 1 to 10, a group of the formula —$SO_2N(R^1)R^2$— or of the formula —$CON(R^1)R^2$—, where $R^1$ is an alkyl group having 1 to 10 carbon atoms and $R^2$ is a linear or branched alkylene group having 1 to 10 carbon atoms, or a group of the formula —$CH_2CH(OR^3)CH_2$— where $R^3$ represents a hydrogen atom or an acyl group having 1 to 10 carbon atoms such as formyl or acetyl, or a group of the formula —Ar—$CH_2$— where Ar is an arylene group optionally having a substituent, or a —$(CH_2)_m$—$SO_2$—$(CH_2)_n$— group, or a —$(CH_2)_m$—S—$(CH_2)_n$— group (wherein m is from 1 to 10 and n is from 0 to 10.). X may be for example H, Me (methyl group), Cl, Br, I, F, CN and/or $CF_3$.

The fluorine-containing monomer (A1) is preferably an acrylate ester of the formula:

$$CH_2=C(-X)-C(=O)-Y-Z-Rf \qquad (I)$$

wherein X is a hydrogen atom, a linear or branched alkyl group having 1 to 21 carbon atoms, a fluorine atom, a chlorine atom, a bromine atom, a iodine atom, a $CFX^1X^2$ group (wherein $X^1$ and $X^2$ is a hydrogen atom a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group;
Y is —O— or —NH—;
Z is a direct bond, an aliphatic group having 1 to 10 carbon atoms, an aromatic or cycloaliphatic group having 6 to 18 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group.), a —$(CH_2)_m$—$SO_2$—$(CH_2)_n$— group, or a —$(CH_2)_m$—S—$(CH_2)_n$— group (wherein m is from 1 to 10 and n is from 0 to 10.); and
Rf is a linear or branched fluoroalkyl group having 1 to 20 carbon atoms.

The alpha-position of the fluorine-containing monomer may be substituted with a halogen atom or the like. Accordingly, in the formula (I) (or in the fluorine-containing monomer), X may be a linear or branched alkyl group having 2 to 21 carbon atoms, a fluorine atom, a chlorine atom, a bromine atom, a iodine atom, a $CFX^1X^2$ group (wherein $X^1$ and $X^2$ is a hydrogen atom, a fluorine atom, a chlorine atom, a bromine atom or a iodine atom.), a cyano group, a linear or branched fluoroalkyl group having 1 to 21 carbon atoms, a substituted or unsubstituted benzyl group, or a substituted or unsubstituted phenyl group.

In the formula (I), the Rf group is preferably a perfluoroalkyl group. The carbon number of the Rf group is from 1 to 20, for example, from 1 to 12, preferably from 1 to 8, particularly from 1 to 6, especially from 4 to 6.

Z is preferably an aliphatic group having 1 to 10 carbon atoms, an aromatic group or cycloaliphatic group having 6 to 18 carbon atoms, a —$CH_2CH_2N(R^1)SO_2$— group ($R^1$ is an alkyl group having 1 to 4 carbon atoms.), a —$CH_2CH(OY^1)CH_2$— group ($Y^1$ is a hydrogen atom or an acetyl group.), a —$(CH_2)_m$—$SO_2$—$(CH_2)_n$— group, or a —$(CH_2)_m$—S—$(CH_2)_n$— group (wherein m is from 1 to 10 and n is from 0 to 10.). The aliphatic group is preferably an alkylene group (particularly the carbon number is from 1 to 4, for example, 1 or 2.). The aromatic group and cycloaliphatic group may be substituted or unsubstituted. When n is 0, the —$SO_2$— or —S— group directly bonds to the Rf group.

The non-limiting examples of the fluorine-containing monomer (A1) are as follows:

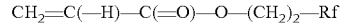

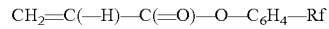

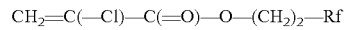

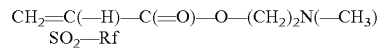

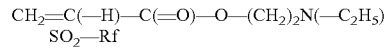

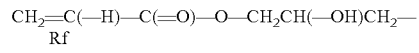

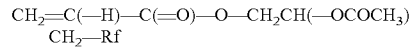

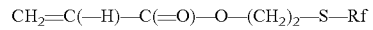

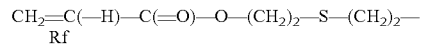

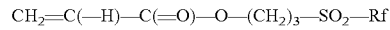

CH₂=C(—H)—C(=O)—O—(CH₂)₂—SO₂—(CH₂)₂—Rf

CH₂=C(—H)—C(=O)—NH—(CH₂)₂—Rf

CH₂=C(—CH₃)—C(=O)—O—(CH₂)₂—S—Rf

CH₂=C(—CH₃)—C(=O)—O—(CH₂)₂—S—(CH₂)₂—Rf

CH₂=C(—CH₃)—C(=O)—O—(CH₂)₃—SO₂—Rf

CH₂=C(—CH₃)—C(=O)—O—(CH₂)₂—SO₂—(CH₂)₂—Rf

CH₂=C(—CH₃)—C(=O)—NH—(CH₂)₂—Rf

CH₂=C(—F)—C(=O)—O—(CH₂)₂—S—Rf

CH₂=C(—F)—C(=O)—O—(CH₂)₂—S—(CH₂)₂—Rf

CH₂=C(—F)—C(=O)—O—(CH₂)₂—SO₂—Rf

CH₂=C(—F)—C(=O)—O—(CH₂)₂—SO₂—(CH₂)₂—Rf

CH₂=C(—F)—C(=O)—NH—(CH₂)₂—Rf

CH₂=C(—Cl)—C(=O)—O—(CH₂)₂—S—Rf

CH₂=C(—Cl)—C(=O)—O—(CH₂)₂—S—(CH₂)₂—Rf

CH₂=C(—Cl)—C(=O)—O—(CH₂)₂—SO₂—Rf

CH₂=C(—Cl)—C(=O)—O—(CH₂)₂—SO₂—(CH₂)₂—Rf

CH₂=C(—Cl)—C(=O)—NH—(CH₂)₂—Rf

CH₂=C(—CF₃)—C(=O)—O—(CH₂)₂—S—Rf

CH₂=C(—CF₃)—C(=O)—O—(CH₂)₂—S—(CH₂)₂—Rf

CH₂=C(—CF₃)—C(=O)—O—(CH₂)₂—SO₂—Rf

CH₂=C(—CF₃)—C(=O)—O—(CH₂)₂—SO₂—(CH₂)₂—Rf

CH₂=C(—CF₃)—C(=O)—NH—(CH₂)₂—Rf

CH₂=C(—CF₂H)—C(=O)—O—(CH₂)₂—S—Rf

CH₂=C(—CF₂H)—C(=O)—O—(CH₂)₂—S—(CH₂)₂—Rf

CH₂=C(—CF₂H)—C(=O)—O—(CH₂)₂—SO₂—Rf

CH₂=C(—CF₂H)—C(=O)—O—(CH₂)₂—SO₂—(CH₂)₂—Rf

CH₂=C(—CF₂H)—C(=O)—NH—(CH₂)₂—Rf

CH₂=C(—CN)—C(=O)—O—(CH₂)₂—S—Rf

CH₂=C(—CN)—C(=O)—O—(CH₂)₂—S—(CH₂)₂—Rf

CH₂=C(—CN)—C(=O)—O—(CH₂)₂—SO₂—Rf

CH₂=C(—CN)—C(=O)—O—(CH₂)₂—SO₂—(CH₂)₂—Rf

CH₂=C(—CN)—C(=O)—NH—(CH₂)₂—Rf

CH₂=C(—CF₂CF₃)—C(=O)—O—(CH₂)₂—S—Rf

CH₂=C(—CF₂CF₃)—C(=O)—O—(CH₂)₂—S—(CH₂)₂—Rf

CH₂=C(—CF₂CF₃)—C(=O)—O—(CH₂)₂—SO₂—Rf

CH₂=C(—CF₂CF₃)—C(=O)—O—(CH₂)₂—SO₂—(CH₂)₂—Rf

CH₂=C(—CF₂CF₃)—C(=O)—NH—(CH₂)₂—Rf

CH₂=C(—F)—C(=O)—O—(CH₂)₃—S—Rf

CH₂=C(—F)—C(=O)—O—(CH₂)₃—S—(CH₂)₂—Rf

CH₂=C(—F)—C(=O)—O—(CH₂)₃—SO₂—Rf

CH₂=C(—F)—C(=O)—O—(CH₂)₃—SO₂—(CH₂)₂—Rf

CH₂=C(—F)—C(=O)—NH—(CH₂)₃—Rf

CH₂=C(—Cl)—C(=O)—O—(CH₂)₃—S—Rf

CH₂=C(—Cl)—C(=O)—O—(CH₂)₃—S—(CH₂)₂—Rf

CH₂=C(—Cl)—C(=O)—O—(CH₂)₃—SO₂—Rf

CH₂=C(—Cl)—C(=O)—O—(CH₂)₃—SO₂—(CH₂)₂—Rf

CH₂=C(—CF₃)—C(=O)—O—(CH₂)₃—S—Rf

CH₂=C(—CF₃)—C(=O)—O—(CH₂)₃—S—(CH₂)₂—Rf

CH₂=C(—CF₃)—C(=O)—O—(CH₂)₃—SO₂—Rf

CH₂=C(—CF₃)—C(=O)—O—(CH₂)₃—SO₂—(CH₂)₂—Rf

CH₂=C(—CF₂H)—C(=O)—O—(CH₂)₃—S—Rf

CH₂=C(—CF₂H)—C(=O)—O—(CH₂)₃—S—(CH₂)₂—Rf

CH₂=C(—CF₂H)—C(=O)—O—(CH₂)₃—SO₂—Rf

CH₂=C(—CF₂H)—C(=O)—O—(CH₂)₃—SO₂—(CH₂)₂—Rf

CH₂=C(—CN)—C(=O)—O—(CH₂)₃—S—Rf

CH₂=C(—CN)—C(=O)—O—(CH₂)₃—S—(CH₂)₂—Rf

CH₂=C(—CN)—C(=O)—O—(CH₂)₃—SO₂—Rf

CH₂=C(—CN)—C(=O)—O—(CH₂)₃—SO₂—(CH₂)₂—Rf

CH₂=C(—CF₂CF₃)—C(=O)—O—(CH₂)₃—S—Rf

CH₂=C(—CF₂CF₃)—C(=O)—O—(CH₂)₃—S—(CH₂)₂—Rf

CH₂=C(—CF₂CF₃)—C(=O)—O—(CH₂)₃—SO₂—Rf

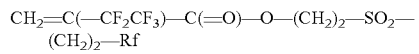

wherein Rf is a linear or branched fluoroalkyl group having 1 to 20 carbon atoms.

(A2) (Meth)Acrylate Monomer Having a Cyclic Hydrocarbon Group

The fluorine-containing polymer has the repeating units derived from the cyclic hydrocarbon group-containing (meth)acrylate monomer (A2).

Generally, the (meth)acrylate monomer (A2) having a cyclic hydrocarbon group is a monomer free from a fluorine atom. The (meth)acrylate monomer (A2) having a cyclic hydrocarbon group is a compound having a (preferably monovalent) cyclic hydrocarbon group and a monovalent (meth)acrylate group. The monovalent cyclic hydrocarbon group may be directly bonded to the (meth)acrylate group. The cyclic hydrocarbon group includes saturated or unsaturated, monocyclic groups, polycyclic groups and bridged ring groups. The cyclic hydrocarbon group is preferably saturated. Preferably, the (meth)acrylate monomer (A2) has 4 to 20 carbon atoms. Examples of the cyclic hydrocarbon group includes an cycloaliphatic group having 4-20 carbon atoms, particularly 5-12 carbon atoms, an aromatic group having 6-20 carbon atoms, and an araliphatic group having 7-20 carbon atoms. The cyclic hydrocarbon group preferably has at most 15 carbon atoms, particularly at most 10 carbon atoms. Preferably, a carbon atom in a ring in the cyclic hydrocarbon group directly bonds to (an oxygen atom of) an ester group in the (meth)acrylate monomer. The cyclic hydrocarbon group is preferably a saturated cycloaliphatic group. Specific examples of the cyclic hydrocarbon group include a cyclohexyl group, a t-butyl cyclohexyl group, an isobornyl group, a dicyclopentanyl group and a dicyclopentenyl group. The (meth)acrylate group is an acrylate group and a methacrylate group, and is preferably a methacrylate group.

Specific examples of the (meth)acrylate monomer (A2) having a cyclic hydrocarbon group include cyclohexyl methacrylate, t-butylcyclohexyl methacrylate, benzyl methacrylate, isobornyl methacrylate, isobornyl acrylate, dicyclopentanyl methacrylate, dicyclopentanyl acrylate, and dicyclopentenyl acrylate.

(A3) Other Monomer

The fluorine-containing polymer of the present invention may contain repeating units derived from (A3) other monomer which is other than monomers (A1) and (A2). Preferably the other monomer (A3) is free from a fluorine atom. Examples of the other monomer (A3) include (A3-1) a non-crosslinkable monomer and (A3-2) a crosslinkable monomer.

(A3-1) Non-crosslinkable Monomer

The non-crosslinkable monomer (A3-1) is different from the crosslinkable monomer (A3-2) and is non-crosslinkable. The non-crosslinkable monomer (A3-1) is preferably a fluorine-free monomer having a carbon-carbon double bond. The non-crosslinkable monomer (A3-1) is generally a vinyl compound free from fluorine. The non-crosslinkable monomer (A3-1) is generally a compound having one carbon-carbon double bond. Preferable examples of the non-crosslinkable monomer (A3-1) include, for example, ethylene, vinyl acetate, vinyl halide such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, and vinyl alkyl ether. The non-crosslinkable monomer (A3-1) is not limited to these examples. The non-crosslinkable monomer (A3-1) is preferably vinyl halide and/or vinylidene halide.

The non-crosslinkable monomer (A3-1) may be a (meth)acrylate ester having an alkyl group. The number of carbon atoms of the alkyl group may be from 1 to 30, for example, from 6 to 30, e.g., from 10 to 30. For example, the non-crosslinkable monomer (A3-1) may be acrylates of the general formula:

wherein $A^1$ is a hydrogen atom, a methyl group, or a halogen atom (for example, a chlorine atom, a bromine atom and a iodine atom) other than a fluorine atom, and $A^2$ is an alkyl group represented by $C_nH_{2n+1}$ (n=1 to 30).

(A3-2) Crosslinkable Monomer

The fluorine-containing polymer may contain the repeating units derived from the crosslinkable monomer (A3-2). The crosslinkable monomer (A3-2) may be a fluorine-free compound having at least two reactive groups and/or carbon-carbon double bonds. The crosslinkable monomer (A3-2) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (A3-2) include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, isoprene, chloroprene, glycerol (meth)acrylate and glycidyl (meth)acrylate, to which the crosslinkable monomer is not limited.

The copolymerization with the non-crosslinkable monomer (A3-1) and/or the crosslinkable monomer (A3-2) can optionally improve various properties such as water repellency and soil resistance; cleaning durability and washing durability of said repellency and resistance; solubility in solvent; hardness; and feeling.

In the fluorine-containing polymer,
the amount of the (meth)acrylate monomer (A2) may be from 0.1 to 300 parts by weight, for example, from 1 to 80 parts by weight, and the amount of the other monomer (A3) may be at most 150 parts by weight, for example, 0.1 to 100 parts by weight, based on 100 parts by weight of the fluorine-containing monomer (A1).

The amount of the other monomer (A3-1) may be at most 100 parts by weight, for example, 0.1 to 50 parts by weight, and The amount of the other monomer (A3-2) may be at most 50 parts by weight, for example, at most 20 parts by weight, particularly 0.1 to 15 parts by weight, based on 100 parts by weight of the fluorine-containing monomer (A1).

The monomer (A) can be polymerized in the presence of the organopolysiloxane (B). Examples of an olefinically unsaturated co-monomer included in the other monomer (A3) include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the resulting polymeric product resulting from the reaction of the monomer (A) and the organopolysiloxane (B); for example an acrylate having a long chain alkyl group of 4-20, particularly 8-20 carbon atoms such as stearyl acrylate or methacrylate, octyl acrylate, 2-ethylhexyl acrylate or dodecyl acrylate or methacrylate can be used to form a softer polymer of lower Tg. Copolymers with an alkyl acrylate or methacrylate monomer may improve various properties such as water- and oil-repellency and soil releasability, cleaning durability, washing durability and abrasion resistance of such repellency and releasability, solubility in solvent, hardness and feel (handle). Other acrylate or methacrylate comonomers which can be used include polyethylene glycol acrylate or methacrylate, polypropylene glycol acrylate or methacrylate, methoxypolyethylene glycol acrylate or methacrylate and methoxypolypropylene glycol acrylate or methacrylate. Other olefinically unsaturated comonomers which can be used include vinyl chloride, vinylidene chloride, styrene, acrylonitrile, methacrylonitrile, ethylene, a vinyl alkyl ether, isoprene or a vinyl ester such as vinyl acetate or vinyl propionate. The olefinically unsaturated comonomer can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated comonomers containing them are acrylamide, methacrylamide, N-methylolacrylamide, hydroxyethyl methacrylate, hydroxyethyl acrylate, 3-chloro-2-hydroxypropyl acrylate or methacrylate, N,N-dimethylaminoethyl acrylate or methacrylate and diethylaminoethyl acrylate or methacrylate.

(B) Functional Organopolysiloxane

The functional organopolysiloxane is a mercapto-functional organopolysiloxane, a vinyl-functional organopolysiloxane, a (meth)acrylamide-functional organopolysiloxane, (meth)acrylate-functional group or a mixture thereof. The functional organopolysiloxane (B) functions as a chain transfer agent. By a polymerization reaction, the functional organopolysiloxane (B) bonds to the fluorine-containing polymer through the functional organic group.

Component (B) of the present invention may be a mercapto-functional organopolysiloxane, that is, an organopolysiloxane having a mercapto-functional organic group present in the molecule. As used herein, a "mercapto-functional organic group" is any organic group containing a sulfur atom, such as —$(CH_2)_n$—SH (n is the number of 0 to 10, particularly 1 to 5).

Component (B) of the present invention may be a vinyl-functional organopolysiloxane, that is, an organopolysiloxane having a vinyl-functional organic group present in the molecule. As used herein, a "vinyl-functional organic group" is a group containing a —CH=$CH_2$ group, such as —$(CH_2)_n$—CH=$CH_2$ (n is the number of 0 to 10, particularly 1 to 5). The vinyl group-containing silicone (B) (that is, the vinyl-functional organopolysiloxane (B)) is a siloxane compound which has at least one (for example, 1 to 500, particularly 2 to 50) vinyl group and a silicone moiety having two or more siloxane linkages.

Component (B) of the present invention may be a (meth)acrylamide-functional organopolysiloxane, that is, an organopolysiloxane having a (meth)acrylamide-functional organic group present in the molecule. The term "(meth)acrylamide" means acrylamide or methacrylamide. As used herein, a "(meth)acrylamide-functional organic group" is a group containing a —NH—C(=O)—CQ=$CH_2$ group, such as —$(CH_2)_n$—NH—C(=O)—CQ=$CH_2$ (wherein Q is a hydrogen atom or a methyl group, and n is the number of 0 to 10, particularly 1 to 5). The (meth)acrylamide group-containing silicone (B) (that is, the (meth)acrylamide-functional organopolysiloxane (B)) is a siloxane compound which has at least one (for example, 1 to 500, particularly 2 to 50) (meth)acrylamide group and a silicone moiety having two or more siloxane linkages.

Component (B) of the present invention may be a (meth)acrylate-functional organopolysiloxane, that is, an organopolysiloxane having a (meth)acrylate-functional organic group present in the molecule. The term "(meth)acrylate" means acrylate or methacrylate. As used herein, a "(meth)acrylate-functional organic group" is a group containing a -Q-O—C(=O)CX=$CH_2$ where Q is a divalent organic group, for example, a $C_{1-20}$ hydrocarbon group such as a $C_{1-10}$ alkylene group, and X is Me or H. The (meth)acrylate group-containing silicone (B) (that is, the (meth)acrylate-functional organopolysiloxane (B)) is a siloxane compound which has at least one (for example, 1 to 500, particularly 1 to 50, especially 2 to 40) (meth)acrylate group and a silicone moiety having two or more siloxane linkages.

Organopolysiloxanes are well known in the art and are often designated by the general formula $R_n SiO_{(4-n)/2}$, where the organopolysiloxanes may comprise any number of "M" (mono functional) siloxy units ($R_3 SiO_{0.5}$), "D" (difunctional) siloxy units ($R_2 SiO$), "T" (trifunctional) siloxy units ($RSiO_{1.5}$), or "Q" siloxy units ($SiO_2$) where R is independently a monovalent organic group. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins. R is independently a monovalent organic group, alternatively R is a hydrocarbon group containing 1 to 30 carbons, alternatively R is an alkyl group containing 1 to 30 carbon atoms, or alternatively R is methyl.

The organopolysiloxanes useful as component (B) in the present invention are characterized by having at least one of the R groups in the formula $R_n SiO_{(4-n)/2}$ be a mercapto, vinyl or (meth)acrylamide group, or alternatively at least one of the R groups be a mercapto, vinyl or (meth)acrylamide group and one of the R groups be an organofunctional group, or alternatively one of the R groups be an organofunctional group also containing a mercapto, vinyl or (meth)acrylamide group. The organofunctional group and mercapto-, vinyl-, (meth)acrylamide- or (meth)acrylate-functional group may be present on any siloxy unit having an R substituent, that is, they may be present on any M, D, or T unit. Typically, the organofunctional groups and mercapto, vinyl, (meth)acrylamide or (meth)acrylate groups are present as a R substituent on a D siloxy unit.

As used herein, "organofunctional group" means an organic group containing any number of carbon atoms, but the group contains at least one atom other than carbon and hydrogen. Representative examples of such organofunctional groups include, amines, amides, sulfonamides, quaternaries, ethers, epoxy, phenols, esters, carboxyls, ketones, halogen substituted alkyls and aryls group, to name a few. Alternatively, the organofunctional group is an amino-functional organic group.

When the organofunctional group is an amino-functional organic group, the amino-functional organic group is designated in the formulas herein as $R^N$ and is illustrated by groups having the formula: —$R^1 NHR^2$, —$R^1 NR_2^2$, or —$R^1 NHR^1 NHR^2$, wherein each $R^1$ is independently a divalent hydrocarbon group having at least 2 carbon atoms, and $R^2$ is hydrogen or an alkyl group which may have 1 to 10 carbon atoms. Each $R^1$ is typically an alkylene group having from 2 to 20 carbon atoms. $R^1$ is illustrated by groups such as; —$CH_2 CH_2$—, —$CH_2 CH_2 CH_2$—, —$CH_2 CHCH_3$—, —CH₂CH₂CH₂CH₂—, —CH₂CH(CH₃)CH₂—, —CH₂CH₂CH₂CH₂CH₂—, —CH₂CH₂CH₂CH₂CH₂CH₂—, —CH₂CH₂CH(CH₂CH₃)CH₂CH₂CH₂—, —CH₂CH₂CH₂CH₂CH₂CH₂CH₂CH₂—, and —CH₂CH₂CH₂CH₂CH₂CH₂CH₂CH₂CH₂CH₂—. The alkyl groups $R^2$ are as illustrated above for R. When $R^2$ is an alkyl group, it is typically methyl.

Some examples of suitable amino-functional hydrocarbon groups are; —CH₂CH₂NH₂, —CH₂CH₂CH₂NH₂, —CH₂CHCH₃NH, —CH₂CH₂CH₂CH₂NH₂, —CH₂CH₂CH₂CH₂CH₂NH₂, —CH₂CH₂CH₂CH₂CH₂CH₂NH₂, —CH₂CH₂NHCH₃, —CH₂CH₂CH₂NHCH₃, —CH₂(CH₃)CHCH₂NHCH₃, —CH₂CH₂CH₂CH₂NHCH₃, —CH₂CH₂NHCH₂CH₂NH₂, —CH₂CH₂CH₂NHCH₂CH₂CH₂NH₂, —CH₂CH₂CH₂CH₂NHCH₂CH₂CH₂CH₂NH₂, —CH₂CH₂NHCH₂CH₂NHCH₃, —CH₂CH₂CH₂NHCH₂CH₂CH₂NHCH₃, —CH₂CH₂CH₂CH₂NHCH₂CH₂CH₂CH₂NHCH₃, and —CH₂CH₂NHCH₂CH₂NHCH₂CH₂CH₃. Typically, the amino-functional group is —CH₂CH₂CH₂NH₂

The mercapto-functional organic group is designated in the formulas herein as $R^S$ and is illustrated by groups having the formula: —$R^1SR^2$, wherein each $R^1$ and $R^2$ is as defined above. The mercapto-functional group is illustrated by the following formulae; —CH₂CH₂CH₂SH, —CH₂CHCH₃SH, —CH₂CH₂CH₂CH₂SH, —CH₂CH₂CH₂CH₂CH₂SH, —CH₂CH₂CH₂CH₂CH₂CH₂SH, —CH₂CH₂SCH₃. Typically, the mercapto-functional group is —CH₂CH₂CH₂SH.

The vinyl-functional organic group is designated in the formulas herein as $R^V$. The vinyl-functional organic group is illustrated by the following formulae; —CH=CH₂, —CH₂CH₂CH₂—CH=CH₂, —CH₂CHCH₃—CH=CH₂, —CH₂CH₂CH₂CH₂—CH=CH₂, —CH₂CH₂CH₂CH₂CH₂—CH=CH₂, —CH₂CH₂CH₂CH₂CH₂CH₂—CH=CH₂. Typically, the vinyl-functional group is —CH=CH₂.

The (meth)acrylamide-functional organic group is designated in the formulas herein as $R^A$ and is illustrated by groups having the formula: —$R^1$—NH—C(=O)—CQ=CH₂ group (wherein $R^1$ is a divalent hydrocarbon group having at least 2 carbon atoms, and Q is a hydrogen atom or a methyl group). The (meth)acrylamide-functional group is illustrated by the following formulae; —CH₂CH₂CH₂—NH—C(=O)—CH=CH₂, —CH₂CH₂CH₂—NH—C(=O)—C(CH₃)=CH₂, —CH₂CHCH₃—NH—C(=O)—CH=CH₂, —CH₂CHCH₃—NH—C(=O)—C(CH₃)=CH₂, —CH₂CH₂CH₂CH₂—NH—C(=O)—C(CH₃)=CH₂, —CH₂CH₂CH₂CH₂—NH—C(=O)—C(CH₃)=CH₂. Typically, the (meth)acrylamide-functional group is —CH₂CH₂CH₂—NH—C(=O)—C(CH₃)=CH₂.

The (meth)acrylate-functional organic group is designated in the formulas herein as $R^{MA}$ and is illustrated by groups having the formula: —$R^1$—O—C(=O)—CQ=CH₂ group (wherein $R^1$ is a divalent hydrocarbon group having at least 2 carbon atoms, and Q is a hydrogen atom or a methyl group). The (meth)acrylate-functional group is illustrated by the following formulae; —CH₂CH₂CH₂—O—C(=O)—CH=CH₂, —CH₂CH₂CH₂—O—C(=O)—C(CH₃)=CH₂, —CH₂CHCH₃—O—C(=O)—CH=CH₂, —CH₂CHCH₃—O—C(=O)—C(CH₃)=CH₂, —CH₂CH₂CH₂CH₂—O—C(=O)—C(CH₃)=CH₂, —CH₂CH₂CH₂CH₂—O—C(=O)—C(CH₃)=CH₂. Typically, the (meth)acrylate-functional group is —CH₂CH₂CH₂—O—C(=O)—C(CH₃)=CH₂.

In a preferable embodiment, the organopolysiloxane (designated B') comprises siloxy units having the average formula:

$$(R_2SiO)_a(RR^NSiO)_b(RR^{F'}SiO)_c$$

where; a is 0-4000, alternatively 1 to 1000, alternatively 2 to 400,
  b is 0-1000, alternatively 1 to 100, alternatively 2 to 50,
  c is 1-1000, alternatively 2 to 100, alternatively 3 to 50;
R is independently a monovalent organic group,
  alternatively R is a hydrocarbon containing 1-30 carbon atoms,
    alternatively R is a monovalent alkyl group containing 1-12 carbons, or
    alternatively R is a methyl group;
$R^N$ is a monovalent amino-functional organic group as defined above,
$R^{F'}$ is $R^S$ (a monovalent mercapto-functional organic group as defined above), $R^V$ (a monovalent vinyl-functional organic group as defined above), $R^A$ (a monovalent (meth)acrylamide-functional organic group as defined above) or $R^{MA}$ (a monovalent (meth)acrylate-functional organic group).

The $R^N$ group may be $R^F$ wherein $R^F$ may be a monovalent organofunctional organic group as defined above, such as hydroxyls, amines, amides, sulfonamides, quaternaries, ethers, epoxy, phenols, esters, carboxyls, ketones, halogen-substituted alkyls and aryls group. For example, the functional organopolysiloxane may comprise siloxy units having the average formula:

$$(R_2SiO)_a(RR^FSiO)_b(RR^{F'}SiO)_c$$

wherein the groups and subscripts (that is, a, b and c) are the same define above.

Organopolysiloxane (B') may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively the organopolysiloxane can be terminated with a trimethylsilyl group.

The organopolysiloxane (B') of this preferable embodiment can be represented by the following average formula for example;

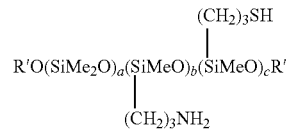

where; a is 0-4000, alternatively 1 to 1000, alternatively 2 to 400,
  b is 0-1000, alternatively 1 to 100, alternatively 2 to 50,
  c is 1-1000, alternatively 2 to 100, alternatively 3 to 50;
and R' is H, an alkyl group having 1 to 40 carbon atoms, or Me₃Si.

The amino-mercapto-functional organopolysiloxane terpolymers of this preferable embodiment (B') can be prepared by any technique known in the art for preparation of organopolysiloxane terpolymers containing amino and/or mercapto-functional groups. Typically, the organopolysiloxanes (B') are prepared via a condensation polymerization reaction of an amino-functional alkoxy silane, a mercapto-functional silane monomer, and organopolysiloxane having alkoxy or silanol termination as illustrated by the following general reaction scheme.

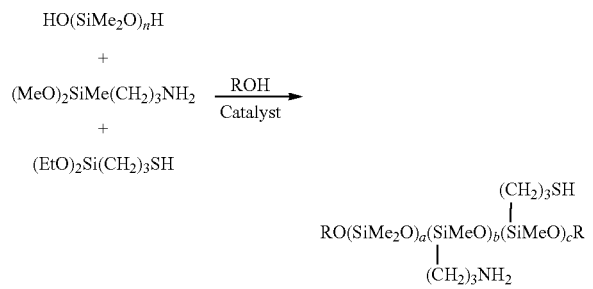

Condensation organopolysiloxanes are well known in the art and are typically catalyzed by the addition of a strong base, such as an alkaline metal hydroxide or a tin compound. Alternatively co-polymerization of the functionalized cyclosiloxanes could be used.

The vinyl group-containing silicone (B) is of, for example, the formula:

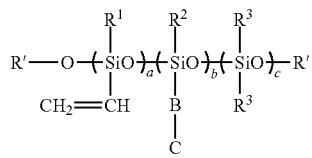

wherein $R^1$ is a methyl group, a methoxy group, a phenyl group, or a hydroxyl group,
$R^2$ is a methyl group, a methoxy group, a phenyl group, or a hydroxyl group,
$R^3$ is a methyl group, a methoxy group, a phenyl group, or a hydroxyl group,
R' is a hydrogen atom, an alkyl group having 1 to 40 carbon atoms, or $Me_3Si$,
B is a divalent saturated hydrocarbon group having 1-10 carbon atoms which may be interrupted with one or two ether linkages,
C is hydroxyls, amines, amides, sulfonamides, quaternaries, ethers, epoxy, phenols, esters, carboxyls, ketones, halogen-substituted alkyls or aryls group,
a, b, and c are integers showing the number of repeat units, a is from 1 to 4000, for example, 2 to 2000, b is from 0 to 1000, preferably from 1 to 800, and c is from 0 to 1000, preferably from 1 to 800.

The example of vinyl group-containing silicone (B) is as follows.

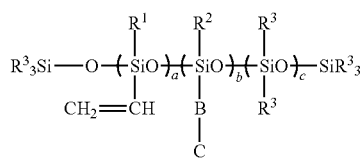

wherein the groups such as the $R^1$ group and the subscripts are defined as the same as above-mentioned.

The functional group C is particularly preferably an amino group (that is, the vinyl group-containing silicone (B) is a vinylamino silicone). The amino group has the effect of remarkably improving the affinity with other materials constituting the cosmetic and with a human body skin.

The organopolysiloxane (B') of the above-mentioned preferable embodiment can be represented by the following average formula for example;

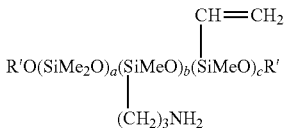

where; a is 0-4000, alternatively 1 to 1000, alternatively 2 to 400,
b is 0-1000, alternatively 1 to 100, alternatively 2 to 50,
c is 1-1000, alternatively 2 to 100, alternatively 3 to 50;
and R' is H, an alkyl group having 1 to 40 carbon atoms, or $Me_3Si$.

The vinylamino-functional organopolysiloxane terpolymers of this preferable embodiment (B') can be prepared by any technique known in the art for preparation of organopolysiloxane terpolymers containing amino and/or vinyl-functional groups. Typically, the organopolysiloxanes (B') are prepared via a condensation polymerization reaction of an amino-functional alkoxy silane, a vinyl-functional silane monomer, and organopolysiloxane having alkoxy or silanol termination as illustrated by the following general reaction scheme.

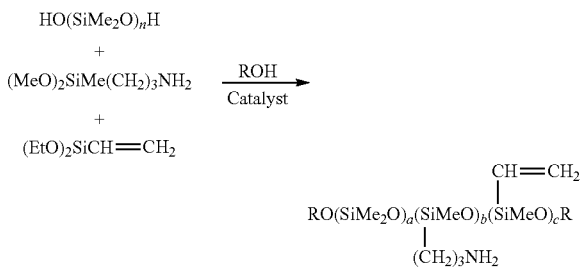

Condensation organopolysiloxanes are well known in the art and are typically catalyzed by the addition of a strong base, such as an alkaline metal hydroxide or a tin compound. Alternatively co-polymerization of the functionalized cyclosiloxanes could be used.

Typically, the (meth)acrylamide-functional organopolysiloxane can be prepared by reacting the amino-functional organopolysiloxane with (meth)acrylic anhydride. In the reaction, amino group (—$NH_2$) is converted into (meth)acrylamide group ((—NH—C(=O)—CQ=$CH_2$ (wherein Q is a hydrogen atom or a methyl group)). For example, the (meth)acrylamide-functional organopolysiloxane may have a ≡Si—$(CH_2)_n$—NH—C(=O)—CQ=$CH_2$ group (wherein Q is a hydrogen atom or a methyl group, and n is the number of 0 to 10, particularly 1 to 5).

Typically, the (meth)acrylate-functional organopolysiloxane can be prepared by reacting a carbinol-functional organopolysiloxane with (meth)acrylic anhydride. In the reaction, with a carbinol functional siloxane, the carbinol group (—OH) is converted into a (meth)acrylate group ((—O—C (=O)—CQ=$CH_2$ (wherein Q is a hydrogen atom or a methyl group)). For example, the methacrylate-functional organopolysiloxane may have a ≡Si—$(CH_2)_n$—O—C (=O)—CQ=CH$_2$ group (wherein Q is a hydrogen atom or a methyl group, and n is the number of 0 to 10, particularly 1 to 5).

The fluorine-containing polymer may have a weight-average molecular weight of 2,000 to 5,000,000, particularly 3,000 to 5,000,000, especially 10,000 to 1,000,000. The weight-average molecular weight (in terms of polystyrene) of the fluorine-containing polymer can be determined by GPC (Gel Permeation Chromatography).

In the fluorine-containing polymer, the repeating units may not be positioned as shown in the chemical formulas, and the fluorine-containing polymer may be a random polymer or block copolymer.

The fluorine-containing polymer of the present invention can be produced by bulk polymerization, solution polymerization and emulsion polymerization.

In the bulk polymerization, a method is adopted in which a mixture of the monomers and the functional organopolysiloxane is purged by nitrogen, a polymerization initiator is then added, and the mixture is stirred in the range of from 30 to 80° C. for several (2 to 15) hours to be polymerized. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of the monomers.

In the case of the solution polymerization, the mixture of the monomers and the functional organopolysiloxane is dissolved in a suitable organic solvent in which these can dissolve and to which these are inert, and then polymerized in the same manner as described earlier. Examples of the organic solvent include a hydrocarbon-based solvent, an ester-based solvent, a ketone-based solvent, an alcohol-based solvent, a silicone-based solvent, and a fluorine-containing solvent. The organic solvent is inert to the monomer and dissolves the monomer, and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In the solution polymerization, there can be used a method of dissolving the monomer(s) into an organic solvent in the presence of a polymerization initiator, replacing the atmosphere by nitrogen, and stirring the mixture with heating, for example, at the temperature within the range from 30 degrees C. to 120 degrees C. for 1 hour to 10 hours.

In the case of the emulsion polymerization, the polymerization is carried out in the same manner as described above after emulsifying a mixture of the monomers and the functional organopolysiloxane in water using a proper emulsifier. In some combinations of the monomers (a) to (c) and the functional organopolysiloxane, a poor compatibility of the monomers and the functional organopolysiloxane in water results in a poor copolymerizability. In such a case, a method in which a proper auxiliary solvent such as glycols and alcohols and/or a low molecular weight monomer is added to improve the compatibility of the mixture is adopted. A hydrophobic group in the emulsifier to be used in the emulsion polymerization may be any of hydrocarbon type, silicon-containing type and fluorine-containing type. As for the ionicity of a hydrophilic group, any of nonionic one, anionic one, cationic one and amphoteric one may be used. As the polymerization initiator for emulsion polymerization, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 30 degrees C. to 120 degrees C., for example, from 50 degrees C. to 80 degrees C., for 1 hour to 10 hours.

When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The emulsifying agent used in the emulsion polymerization may have a hydrophobic group which may be a hydrocarbon, a silicone or a fluorine-containing compound, and hydrophilic group which may be nonionic, anionic, cationic or amphoteric. A combination of the anionic emulsifying agent and the nonionic emulsifying agent is preferable in order to obtain both the stability of the emulsion and safety to skin. The amount of the anionic emulsifying agent is from 5 to 80% by weight, preferably from 10 to 60% by weight, based on the total of the anionic emulsifying agent and the nonionic emulsifying agent. Preferably, the anionic emulsifying agent is polyoxyethylene alkyl (preferably $C_1$ to $C_{30}$ alkyl) ether sulfate salt, and the nonionic emulsifying agent is fatty acid sorbitan ester, polyoxyethylene fatty acid sorbitan ester, polyoxyethylene hardened castor oil and/or polyoxyethylene fatty acid sorbit ester.

In order to obtain a polymer dispersion in water, which has a high polymer solid content and which has very fine and stable particles, it is desirable that the mixture of the monomers and the functional organopolysiloxane is dispersed in water by using an emulsifying device capable of applying a strong shearing energy (e.g., a high-pressure homogenizer and an ultrasonic homogenizer) to prepare the fine particles of the mixture, and then the polymerization is conducted.

The fluorosilicone reaction product of the monomer (A) and the organopolysiloxane (B) may be prepared by any reaction process known in the art to effect polymerisation of such monomers. Preferably, the fluorosilicone may be prepared according to the process of the present invention comprising; reacting the monomer (A) in the presence of the functional organopolysiloxane (B) via a polymerization reaction, preferably a free radical polymerisation reaction.

Components (A) and (B) in the process are the same as described above.

The process may also be conducted in the presence of a polar organic solvent. The polar organic solvent can be one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene a blend of one or more of these.

The initiator for the free radical polymerisation reaction can be any compound known in the art for initiating free radical reactions, such as organic peroxides or azo compounds. Representative, non-limiting examples are; azo compounds such as azobisisobutyronitrile or azobisisovaleronitrile (AIVN), peroxides such as benzoyl peroxide. The polymerisation temperature typically ranges 50-120° C.

Alternatively the polymeric reaction product can be obtained using the technique of emulsion polymerisation, where all the components are polymerised in the presence of water, surfactants and polymerisation initiator.

The fluorosilicone reaction product can contain various ratios of the monomer (A) and the organopolysiloxane (B), as controlled by the amount of each of components (A) and (B). The fluorosilicone may contain 5 to 99.9% by weight, preferably 10 to 95% by weight of the monomer (A), and 0.1 to 95% by weight, preferably 5 to 90% by weight of the organopolysiloxane (B) with the proviso that sum of the wt % of (A) and (B) equals 100%. A fluorosilicone product having a high proportion of organopolysiloxane may provide greater substantivity to fibrous substrates or softness of handle of the treated material. A polymeric product having a high proportion of fluorine-containing monomer may provide maximum hydrophobicity and oleophobicity.

The fluorosilicone reaction product is generally obtained as a solution. It can be isolated by evaporation of the solvent. For application as an oil repellent, the fluorosilicone reaction product is generally required in liquid form and the solution obtained by reaction can often be diluted to a solution suitable for application to textiles. Alternatively the fluorosilicone reaction product can be dissolved in a different solvent for application to textiles, for example in a polar organic solvent of higher boiling point. The fluorosilicone reaction product can alternatively be emulsified by mixing with water and an emulsifying agent, such as a cationic surfactant and/or a nonionic or anionic surfactant. The fluorosilicone reaction product can be isolated before emulsification or the polymerisation product solution can be emulsified, optionally with removal of solvent. If the polymeric product is obtained by emulsion polymerisation, the emulsion is generally used, diluted as required, without isolating the polymeric product.

The solution or emulsion of fluorosilicone reaction product can be applied to fibrous substrates such as textiles by any of the methods known for treatment of textiles with liquids. The concentration of the fluorosilicone reaction product in the solution applied to the textile can for example be 0.5 to 20% by weight, alternatively 1 to 5%. When the textile is a fabric, the fabric can be immersed in the solution or can be padded or sprayed with the solution. The treated textile is dried and is preferably heated, for example at 100-200° C., to develop the oil repellency.

Alternatively, the fluorosilicone reaction product can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The process of the invention generally also renders the textile hydrophobic and water repellent. Fabric treatment with the polymeric product of the invention imparts oil repellency to fabrics whilst at the same time imparting an improvement in feel compared to untreated fabric and also imparting an improvement in feel compared to fabric treated with known fluoropolymer textile treatment agents.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The surface treatment agent of the present invention is preferably in the form of a solution, an emulsion or an aerosol. The surface treatment agent generally comprises the fluorine-containing polymer and a medium (particularly a liquid medium, for example, an organic solvent and/or water). The concentration of the fluorine-containing polymer in the surface treatment agent may be, for example, from 0.1 to 50% by weight.

The surface treatment agent can be applied to a substrate to be treated by a know procedure. The application of the surface treatment agent can be conducted by immersion, spraying and coating. Usually, the surface treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the surface treatment agent. The concentration of the fluorine-containing compound in the treatment liquid contacted with the substrate may be from 0.01 to 10% by weight (particularly for immersion coating), for example, from 0.05 to 10% by weight (particularly for spray coating), based on the treatment liquid.

The substrate to be treated with the surface treatment agent (for example, a water- and oil-repellent agent) of the present invention is preferably a textile. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers.

The textile may be in any form such as a fiber, a yarn and a fabric.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof. All parts and percentages in the examples are on a weight basis and all measurements were obtained at about 23° C., unless indicated to the contrary.

Shower Water Repellency Test (JIS-L-1092)

Shower water repellency test was conducted according to JIS-L-1092. The shower water repellency was expressed by water repellency No. (as shown in the below-described Table 1).

A glass funnel which has a volume of at least 250 ml and a spray nozzle which can spray 250 ml of water for 20-30 seconds are used. A test piece frame is a metal frame having a diameter of 15 cm. Three sheets of a test piece having a size of about 20 cm×20 cm are prepared and the sheet is mounted on a test piece holding frame so that the sheet has no wrinkle. The center of the spray was located on the center of the sheet. Room temperature water (250 mL) is charged into the glass funnel and sprayed on the test piece sheet (for time of 25-30 seconds). The holding frame is removed from a stand, one edge of the holding frame is grasped so that a front surface is downside and the other edge is lightly hit with a stiff substance. The holding frame is further rotated 180° and the same procedure is repeated to drop excess water droplets. The wet test piece is compared with a wet comparison standard to grade 0, 50, 70, 80, 90 and 100 points in order of poor water-repellency to excellent water repellency. The results are obtained from an average of three measurements.

TABLE 1

| Water repellency No. | State |
|---|---|
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Washing Durability of Water-Repellency

Washing is conducted repeatedly ten times or twenty times or thirty times according to JIS L-0217-103 method, and then water- and oil-repellency is evaluated (HL10 or HL20 or HL30). HL0 means that the evaluation is made after no washing.

Feeling

The feeling of a treated fabric is evaluated before washing. The feeling is determined by hand touch according to the following criteria.

4 (Excellent): Remarkably softer than untreated fabric 3 (Very good): Softer than untreated fabric 2 (Good): Same softness as untreated fabric 1 (Poor): Harder than untreated fabric Synthesis of Aminomercapto-functional Siloxane:

Synthetic Example 1

Siloxane A

Into a three necked round bottomed flask fitted with a condenser, overhead stirrer and thermocouple were charged first silanol-terminated polydimethylsiloxane (323 g, Mn: about 900), second silanol-terminated polydimethylsiloxane (380 g, Mn: about 300), mercaptopropylmethyldimethoxysilane (230 g), aminopropylmethyldiethoxysilane (27 g), trimethylethoxysilane (42 g), barium hydroxide (0.62 g) and sodium orthophosphate (0.25 g). The reaction mixture was heated to 75° C. and held at this temperature for three hours. Then the volatiles were removed under reduced pressure (200 mbar) at 75° C. for four hours to yield an aminomercaptosiloxane.

The physical and structural properties of the aminomercaptosiloxane are described in the table below:

TABLE 2

| | Mn | Viscosity (cSt) | % N (w/w) | % SH (w/w) | % (SiMe$_3$ terminal group) | % (OR terminal group or SiOH terminal group) |
|---|---|---|---|---|---|---|
| Siloxane A | 4396 | 74 | 0.26 | 4.10 | 9 | 91 |

Preparative Example 1

Into a 1 L autoclave, CF$_3$CF$_2$—(CF$_2$CF$_2$)$_n$—CH$_2$CH$_2$OCOC(CH$_3$)=CH$_2$ (average of n=2.0) (13FMA) (138 g), isobornyl methacrylate (IBMA) (22.9 g), aminomercaptosiloxane ("Siloxane A" or "Si") (22.8 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following formula:

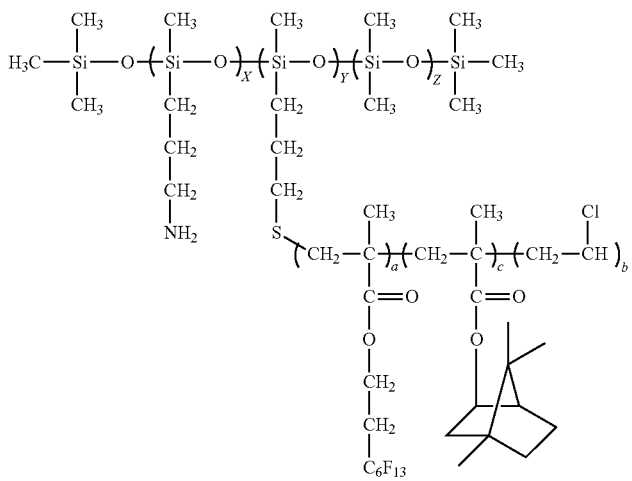

wherein x, y and z are such numbers that the mole ratio of units is 1:7:50, and a, b and c are such numbers that weight ratio of 13FMA:IBMA:VCM is 60:20:20. The chemical formula is that the amine (Si—$CH_2CH_2CH_2NH_2$) does not form a Michael adduct of the (meth)acrylates, but the amine may form the Michael adduct of the (meth)acrylates, that is, (Si—$CH_2CH_2CH_2NH$—$CH_2C(CH_3)HC(\!\!=\!\!O)O$—$R^v$ (wherein $R^v$ is a $CF_3CF_2$—$(CF_2CF_2)_n$—$CH_2CH_2$— group or an isobornyl group).

In the polymer, the weight ratio of 13FMA:IBMA:VCM:Si was 60:20:20:10.

Preparative Example 2

Into a 1 L autoclave, $CF_3CF_2$—$(CF_2CF_2)_n$—$CH_2CH_2OCOC(CH_3)\!\!=\!\!CH_2$ (average of n=2.0) (13FMA) (138 g), stearyl acrylate(StA)(11.5 g), isobornyl methacrylate (IBMA) (11.5 g), aminomercaptosiloxane ("Siloxane A" or "Si") (22.8 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following formula.

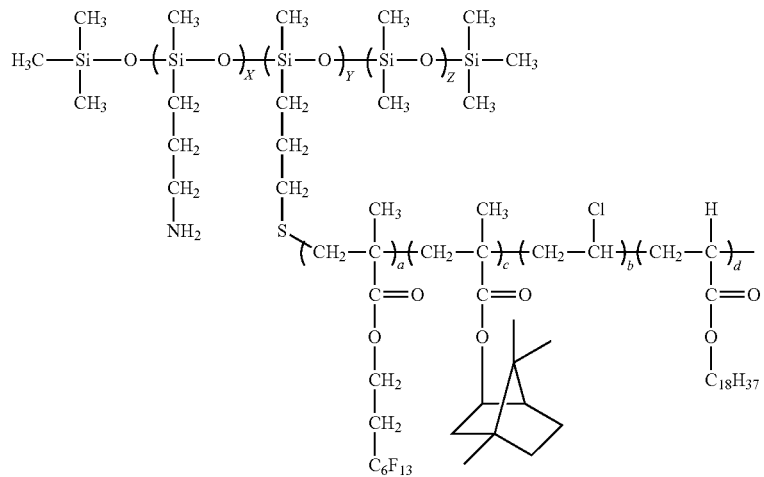

wherein x, y and z are such numbers that the mole ratio of units is 1:7:50, and a, b, c and d are such numbers that weight ratio of 13FMA:IBMA:VCM:StA is 60:10:20:10. The chemical formula is that the amine (Si—$CH_2CH_2CH_2NH_2$) does not form a Michael adduct of the (meth)acrylates, but the amine may form the Michael adduct of the (meth)acrylates, that is, (Si—$CH_2CH_2CH_2NH$—$CH_2C(R')HC(\!\!=\!\!O)O$—$R^v$(wherein $R^v$ is a $CF_3CF_2$—$(CF_2CF_2)_n$—$CH_2CH_2$— group, an isobornyl group or a stearyl group, and R' is a hydrogen atom or a methyl group).

In the polymer, the weight ratio of 13FMA:IBMA:VCM:StA:Si was 60:10:20:10:10.

Preparative Example 3

Into a 1 L autoclave, $CF_3CF_2$—$(CF_2CF_2)_n$—$CH_2CH_2OCOC(CH_3)\!\!=\!\!CH_2$ (average of n=2.0) (13FMA) (138 g), behenyl acrylate (VA) (11.5 g), isobornyl methacrylate (IBMA) (11.5 g), aminomercaptosiloxane ("Siloxane A" or "Si") (22.8 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following formula.

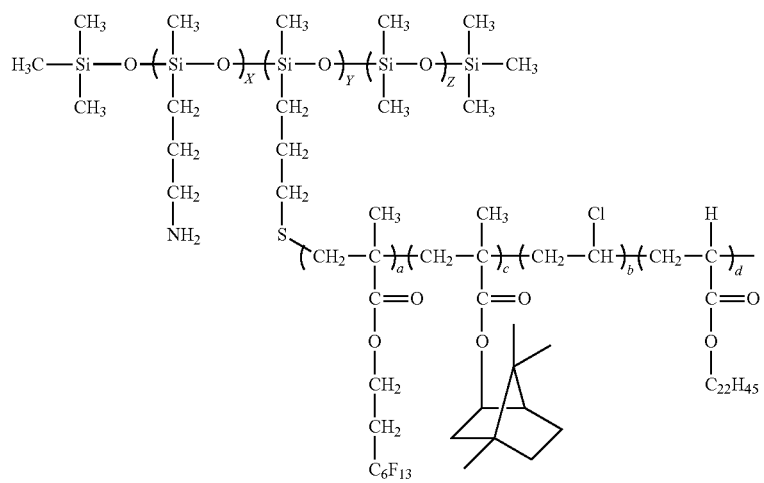

wherein x, y and z are such numbers that the mole ratio of units is 1:7:50, and a, b, c and d are such numbers that weight ratio of 13FMA:IBMA:VCM:VA is 60:10:20:10. The chemical formula is that the amine (Si—$CH_2CH_2CH_2NH_2$) does not form a Michael adduct of the (meth)acrylates, but the amine may form the Michael adduct of the (meth)acrylates, that is, (Si—$CH_2CH_2CH_2NH$—$CH_2C(R')HC(=O)O$—$R^v$ (wherein $R^v$ is a $CF_3CF_2$—$(CF_2CF_2)_n$—$CH_2CH_2$— group, an isobornyl group or a behenyl group, and R' is a hydrogen atom or a methyl group).

In the polymer, the weight ratio of 13FMA:IBMA:VCM:VA:Si was 60:10:20:10:10.

Comparative Preparative Example 1

Into a 1 L autoclave, $CF_3CF_2$—$(CF_2CF_2)_n$—$CH_2CH_2OCOCH=CH_2$ (average of n=3.2) (17FA) (204 g), stearyl acrylate (StA) (25.6 g), N-methylol acrylamide (6.4 g), 3-chloro-2-hydroxypropyl methacrylate (1.5 g), pure water (486 g), tripropylene glycol (88 g), alkyl trimethyl ammonium chloride (3.4 g), sorbitan monopalmitate (4.6 g), polyoxyethylene oleyl ether (4.9 g) and polyoxyethylene lauryl ether (20.0 g) were charged and emulsified by ultrasonic wave at 60° C. for 15 minutes with stirring. After the atmosphere of the autoclave was replaced with nitrogen gas, vinyl chloride (VCM) (67 g) was injected. Then, 2,2'-azobis (2-amidinopropane) dihydrochloride (2.2 g) was added and the reaction was conducted at 60° C. for 5 hours to give an aqueous dispersion of a polymer having the following formula:

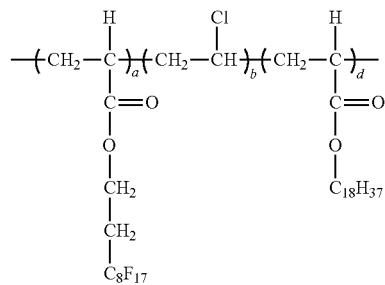

wherein a, b and d are such numbers that weight ratio of 17FA:VCM:StA is 69:9:22.

Comparative Preparative Example 2

Into a 1 L autoclave, $CF_3CF_2$—$(CF_2CF_2)_n$—$CH_2CH_2OCOC(CH_3)=CH_2$ (average of n=2.0) (13FMA) (138 g), isobornyl methacrylate (IBMA) (22.9 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following structure.

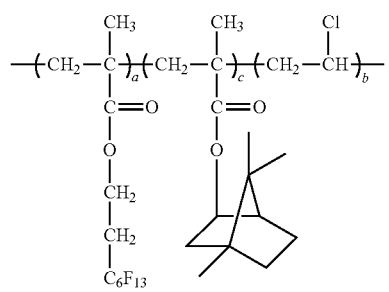

wherein a, b and c are such numbers that weight ratio of 13FMA:IBMA:VCM is 60:20:20.

Comparative Preparative Example 3

Into a 1 L autoclave, $CF_3CF_2—(CF_2CF_2)_n—CH_2CH_2OCOC(CH_3)=CH_2$ (average of n=2.0) (13FMA) (138 g), stearyl acrylate (StA) (11.5 g), isobornyl methacrylate (IBMA) (11.5 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following structure.

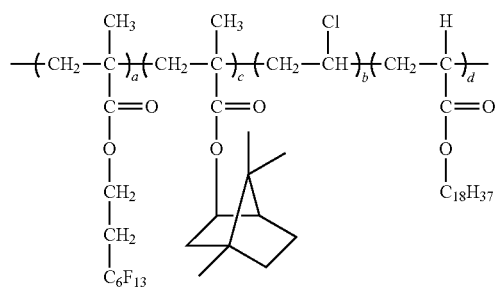

wherein a, b, c and d are such numbers that weight ratio of 13FMA:IBMA:VCM:StA is 60:10:20:10.

Comparative Preparative Example 4

Into a 1 L autoclave, $CF_3CF_2—(CF_2CF_2)_n—CH_2CH_2OCOC(CH_3)=CH_2$ (average of n=2.0) (13FMA) (138 g), behenyl acrylate (VA) (11.5 g), isobornyl methacrylate (IBMA) (11.5 g), pure water (439 g), tripropylene glycol (61 g), polyoxyethylene oleyl ether (8.83 g) and polyoxyethylene tridecyl ether (8.83 g) were charged and emulsified by ultrasonic wave at 60° C. for 15 minutes with stirring. After the atmosphere of the autoclave was replaced with nitrogen gas, vinyl chloride (VCM) (52.5 g) was injected. Then, 2,2'-azobis(2-amidinopropane) dihydrochloride (3.2 g) was added and the reaction was conducted at 60° C. for 5 hours to give an aqueous dispersion of a polymer having the following structure.

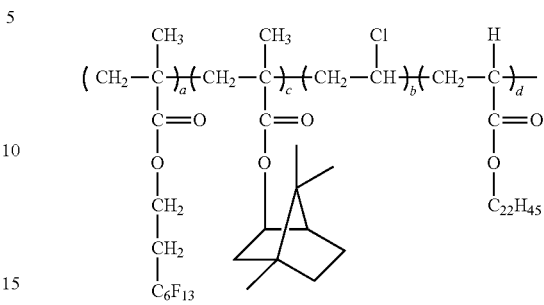

wherein a, b, c and d are such numbers that weight ratio of 13FMA:IBMA:VCM:VA is 60:10:20:10.

Example 1

The aqueous liquid (4.8 g) prepared by Preparative Example 1 was diluted with pure water to prepare a test liquid having a polymer concentration of 0.2, 0.4, or 2.0% by weight. One sheet of a nylon taffeta test fabric (510 mm x 205 mm) was immersed in this test liquid, passed through a mangle, and treated in a pin tenter at 160° C. for 2 minutes. Then the test fabric was cut to give three thirds (each of which has a size of 170 mm x 205 mm). Three thirds of fabric was used for non-washing, washing ten times and washing twenty times, respectively. The fabrics were subjected to the shower water-repellency test, the water-repellency test and the oil repellency test. The same procedure as in the above manner was repeated for one sheet of a nylon white test fabric (510 mm×205 mm), one PET taffeta test fabric (510 mm×205 mm) and one sheet of PET tropical test fabric (510 mm×205 mm). The results are shown in Table 3 (Water-repellency) and Table 4 (Durability of water-repellency and feeling).

Examples 2 to 3 and Comparative Examples 1 to 4

In the same manner as in Example 1, the polymer prepared by each of Preparative Examples 2 to 3 and Comparative Preparative Examples 1 to 4 was processed and then the shower water-repellency test and the feeling test were conducted. The results are shown in Tables 3 and 4.

TABLE 3

|  |  | Example 1 | | Example 2 | | Example 3 | |
| --- | --- | --- | --- | --- | --- | --- | --- |
| Monomer | | 13FMA/IBMA/ VCM/Si 60/20/20/10 | | 13FMA/IBMA/ StA/VCM/Si 60/10/10/20/10 | | 13FMA/IBMA/ VA/VCM/Si 60/10/10/20/10 | |
| Nominal concentration | | 0.2% | 0.4% | 0.2% | 0.4% | 0.2% | 0.4% |
| Water-repellency | Nylon taffeta | 100 | 100 | 100 | 100 | 100 | 100 |
| | Nylon white fabric | 80 | 100+ | 100+ | 100+ | 70 | 100 |
| | PET taffeta | 0 | 100+ | 70 | 100+ | 80 | 100 |
| | PET tropical | 90 | 100+ | 100 | 100+ | 80 | 100 |

TABLE 3-continued

|  |  | Com. Ex. 1 | | Com. Ex. 2 | | Com. Ex. 3 | | Com. Ex. 4 | |
|---|---|---|---|---|---|---|---|---|---|
| Monomer | | 17FA/StA/VCM 69/9/22 | | 13FMA/IBMA/VCM 60/20/20 | | 13FMA/IBMA/StA/VCM 60/10/10/20 | | 13FMA/IBMA/VA/VCM 60/10/10/20 | |
| Nominal concentration | | 0.2% | 0.4% | 0.2% | 0.4% | 0.2% | 0.4% | 0.2% | 0.4% |
| Water-repellency | Nylon taffeta | 100 | 100 | 90+ | 100 | 80 | 100 | 80 | 100 |
| | Nylon white fabric | 70→0 | 100+ | 100+ | 100+ | 50 | 80 | 50 | 80 |
| | PET taffeta | 0 | 90+ | 70 | 100+ | 0 | 50 | 50 | 90 |
| | PET tropical | 80 | 100+ | 100 | 100+ | 0 | 80 | 0 | 90 |

TABLE 4

|  |  | Example 1 | | Example 2 | | Example 3 | |
|---|---|---|---|---|---|---|---|
| Monomer | | 13FMA/IBMA/VCM/Si 60/20/20/10 | | 13FMA/IBMA/StA/VCM/Si 60/10/10/20/10 | | 13FMA/IBMA/VA/VCM/Si 60/10/10/20/10 | |
| Nominal concentration | | 2.0% | 2.0% | 2.0% | 2.0% | 2.0% | 2.0% |
| Fabric | | Nylon taffeta | PET taffeta | Nylon taffeta | PET taffeta | Nylon taffeta | PET taffeta |
| Water-repellency | HL0 | 100 | 100 | 100 | 100 | 100 | 100 |
| | HL10 | 80 | 100 | 100 | 100 | 100 | 100 |
| | HL20 | 70 | 90 | 80 | 100 | 80 | 100 |
| | HL30 | 0 | 90 | 70 | 100 | 70 | 100 |
| Feeling | HL0 | 2 | 2 | 2 | 2 | 2 | 2 |

|  |  | Com. Ex. 1 | | Com. Ex. 2 | | Com. Ex. 3 | | Com. Ex. 4 | |
|---|---|---|---|---|---|---|---|---|---|
| Monomer | | 17FA/StA/VCM 69/9/22 | | 13FMA/IBMA/VCM 60/20/20 | | 13FMA/IBMA/StA/VCM 60/10/10/20 | | 13FMA/IBMA/VA/VCM 60/10/10/20 | |
| Nominal concentration | | 2.0% | 2.0% | 2.0% | 2.0% | 2.0% | 2.0% | 2.0% | 2.0% |
| Fabric | | Nylon taffeta | PET taffeta | Nylon taffeta | PET taffeta | Nylon taffeta | PET taffeta | Nylon taffeta | PET taffeta |
| Water-repellency | HL0 | 100 | 100 | 100 | 100 | 100 | 100 | 100 | 100 |
| | HL10 | 100 | 100 | 80 | 100 | 0 | 100 | 70 | 100 |
| | HL20 | 80 | 100 | 0 | 90 | 0 | 100 | 70 | 100 |
| | HL30 | 70 | 100 | 0 | 90 | 0 | 100 | 0 | 100 |
| Feeling | HL0 | 3 | 3 | 1 | 1 | 1 | 1 | 1 | 1 |

The meanings of abbreviations in the Tables are as follows:
13FMA: $CF_3CF_2$—$(CF_2CF_2)_n$—$CH_2CH_2OCOC(CH_3)$=$CH_2$ (average of n=2.0)
17FMA: $CF_3CF_2$—$(CF_2CF_2)_n$—$CH_2CH_2OCOC(CH_3)$=$CH_2$ (average of n=3.2)
IBMA: Isobornyl methacrylate
VCM: Vinyl chloride
StA: Stearyl acrylate
VA: Behenyl acrylate
Si: Siloxane A prepared in Synthetic Example 1

The invention claimed is:
1. A fluorine-containing polymer for a water- and oil-repellent agent comprising repeating units derived from:
component (A) which comprises;
(A1) a fluorine-containing monomer of the formula:

CH2=C(—X)—C(=O)—Y—Z—Rf wherein X is a hydrogen atom, a monovalent organic group, or a halogen atom,
Y is —O— or —NH—,
Z is a direct bond or a divalent organic group, and
Rf is a fluoroalkyl group having 1 to 20 carbon atoms, and
(A2) a (meth) acrylate monomer having a cyclic hydrocarbon group,
(A3-1) a non-crosslinkable monomer of the formula: CH2=CA1COOA2,
wherein A1 is a hydrogen atom, a methyl group, a chlorine atom, a bromine atom, or an iodine atom, and A2 is an alkyl group represented by CnH2n+1, where n is from 1 to 30,
(A3) at least one monomer selected from the group consisting of vinyl halide and vinylidene halide, and
(B) an amino-mercapto-functional organopolysiloxane having the average formula:

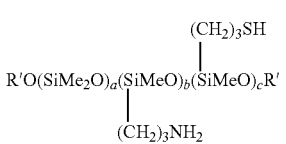

where a is 0-4000, b is 1-1000, c is 1-1000, and R' is H, an alkyl group having 1 to 40 carbon atoms, or Me3Si and wherein Me is a methyl group;

wherein the amino-mercapto-functional organopolysiloxane (B) functions as a chain transfer agent; and wherein the amino-mercapto-functional organopolysiloxane (B) is bonded to the fluorine-containing monomer through the mercapto group of the amino-mercapto-functional organopolysiloxane.

2. A fluorine-containing polymer according to claim 1, wherein the fluorine-containing monomer (A1) is an acrylate ester of the formula:

CH2=C(—X)—C(=O)—Y—Z—Rf    (I)

wherein X is a hydrogen atom, a linear or branched alkyl group having 1 to 21 carbon atoms, a fluorine atom, a chlorine atom, a bromine atom, a iodine atom, a $CFX^1X^2$ group (wherein $X^1$ and $X^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group;

Y is —O— or —NH—;

Z is a direct bond, an aliphatic group having 1 to 10 carbon atoms, an aromatic or cycloaliphatic group having 6 to 18 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group), a —$(CH_2)_m$—$SO_2$—$(CH_2)_n$— group, or a —$(CH_2)_m$—S—$(CH_2)_n$— group (wherein m is from 1 to 10 and n is from 0 to 10); and RF is a linear or branched fluoroalkyl group having 1 to 20 carbon atoms.

3. The fluorine-containing polymer according to claim 1, wherein the (meth) acrylate monomer (A2) is a monomer having a saturated cyclic hydrocarbon group.

4. The fluorine-containing polymer according to claim 1, wherein the (meth)acrylate monomer (A2) has 4 to 20 carbon atoms.

5. The fluorine-containing polymer according to claim 1, wherein, in the (meth)acrylate monomer (A2), a carbon atom in a ring in the cyclic hydrocarbon group directly bonds to an ester group in the (meth)acrylate monomer.

6. The fluorine-containing polymer according to claim 1, wherein, in the (meth)acrylate monomer (A2), the cyclic hydrocarbon group is at least one selected from the group consisting of a cyclohexyl group, a t-butyl cyclohexyl group, an isobornyl group, a dicyclopentanyl group and a dicyclopentanyl group.

7. The fluorine-containing polymer according to claim 1, wherein the (meth)acrylate monomer (A2) is at least one selected from the group consisting of t-butylcyclohexyl methacrylate, benzyl methacrylate, isobornyl methacrylate, isobornyl acrylate, dicyclopentanyl methacrylate, dicyclopentanyl acrylate, and dicyclopentenyl acrylate.

8. The fluorine-containing polymer according to claim 1, which contains also repeating units derived from a monomer other than the monomers (A1), (A2), (A3-1) and (A3).

9. The fluorine-containing polymer according to claim 8, wherein the monomer (A3) is free from a fluorine atom.

10. A method of producing a fluorine-containing polymer for a water- and oil-repellent agent comprising polymerizing repeating units derived from:

component (A) which comprises;

(A1) a fluorine-containing monomer of the formula:

CH2=C(—X)—C(=O)—Y—Z—Rf wherein X is a hydrogen atom, a monovalent organic group, or a halogen atom, Y is —O— or —NH—, Z is a direct bond or a divalent organic group, and Rf is a fluoroalkyl group having 1 to 20 carbon atoms, (A2) a (meth) acrylate monomer having a cyclic hydrocarbon group, and (A3-1) a non-crosslinkable monomer of the formula: CH2=CA1COOA2, wherein A1 is a hydrogen atom, a methyl group, a chlorine atom, a bromine atom, or an iodine atom, and A2 is an alkyl group represented by CnH2n+1, where n is from 1 to 30, (A3) at least one monomer selected from the group consisting of vinyl halide and vinylidene halide, and in the presence of (B) an amino-mercapto-functional organopolysiloxane having the average formula:

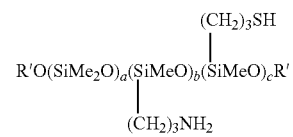

where a is 0-4000, b is 1-1000, c is 1-1000, and R' is H, an alkyl group having 1 to 40 carbon atoms, or $Me_3Si$ and wherein Me is a methyl group;

wherein the amino-mercapto-functional organopolysiloxane (B) functions as a chain transfer agent; and wherein, upon polymerization, the amino-mercapto-functional organopolysiloxane (B) bonds to the fluorine-containing monomer through the mercapto group of the amino-mercapto-functional organopolysiloxane.

11. A water- and oil-repellent agent comprising the fluorine-containing polymer according to claim 1.

12. The water and oil-repellent agent according to claim 11, which contains also an aqueous medium.

13. The water and oil-repellent agent according to claim 11, which is an aqueous dispersion.

14. A method of treating a substrate, comprising applying the water- and oil-repellent agent according to claim 11 to the substrate.

15. A textile treated with the water- and oil-repellent agent according to claim 11.

16. The fluorine-containing polymer according to claim 1 wherein, in the (meth) acrylate monomer (A2), the cyclic hydrocarbon group is a saturated or unsaturated monocyclic group, polycyclic group, or bridged ring group.

17. The fluorine-containing polymer according to claim 1, wherein n is from 10 to 30 in the $A^2$ group of the non-crosslinkable monomer (A3-1).

18. The fluorine-containing polymer according to claim 1, wherein, in the (meth)acrylate monomer (A2), the cyclic hydrocarbon group is a bridged ring group.

* * * * *

UNITED STATES PATENT AND TRADEMARK OFFICE
CERTIFICATE OF CORRECTION

PATENT NO.         : 9,988,759 B2                                Page 1 of 1
APPLICATION NO.    : 13/063809
DATED              : June 5, 2018
INVENTOR(S)        : Shinichi Minami et al.

It is certified that error appears in the above-identified patent and that said Letters Patent is hereby corrected as shown below:

In the Claims

Column 29, Line 33, Claim 2:
"is from 0 to 10); and RF is a linear or branched"
Should read:
--is from 0 to 10); and Rf is a linear or branched--; and Column 29, Line 49, Claim 6:
"an isobornyl group, a dicyclopentanyl group and a dicyclo-"
Should read:
--an isobornyl group, and a dicyclo- --; and Column 29, Line 55/56, Claim 7:
"isobornyl acrylate, dicyclopentanyl methacrylate, dicyclopentanyl acrylate, and dicyclopentenyl acrylate."
Should read:
--isobornyl acrylate, dicyclopentanyl methacrylate, and dicyclopentenyl acylate.--.

Signed and Sealed this
Second Day of April, 2019

Andrei Iancu
*Director of the United States Patent and Trademark Office*